(12) United States Patent
Eiynk et al.

(10) Patent No.: US 9,864,350 B2
(45) Date of Patent: Jan. 9, 2018

(54) EVENTS MANAGEMENT

(71) Applicant: Trane International Inc., Piscataway, NJ (US)

(72) Inventors: Benedict John Eiynk, North Branch, MN (US); Mitchel James Anderson, Hugo, MN (US); Susan M. Mairs, St. Paul, MN (US); Rachel Michael Nilsson, Minneapolis, MN (US); Mark Everett Martin, Chisago City, MN (US)

(73) Assignee: Trane International, Inc., Piscataway, NJ (US)

( * ) Notice: Subject to any disclaimer, the term of this patent is extended or adjusted under 35 U.S.C. 154(b) by 725 days.

(21) Appl. No.: 14/201,329

(22) Filed: Mar. 7, 2014

(65) Prior Publication Data
US 2014/0277753 A1    Sep. 18, 2014

Related U.S. Application Data

(60) Provisional application No. 61/777,079, filed on Mar. 12, 2013.

(51) Int. Cl.
G05B 15/02    (2006.01)

(52) U.S. Cl.
CPC ...... G05B 15/02 (2013.01); G05B 2219/2642 (2013.01)

(58) Field of Classification Search
None
See application file for complete search history.

(56) References Cited

U.S. PATENT DOCUMENTS

| 7,904,186 B2 | 3/2011 | Mairs et al. |
| 7,917,232 B2 | 3/2011 | McCoy et al. |
| 8,024,054 B2 * | 9/2011 | Mairs ............... G09B 25/04 700/17 |
| 7,870,090 B2 | 11/2011 | McCoy et al. |
| 8,050,801 B2 * | 11/2011 | Richards ............... F24F 11/006 370/254 |
| 8,055,386 B2 | 11/2011 | McCoy et al. |
| 8,055,387 B2 * | 11/2011 | McCoy ............... G05B 19/042 370/254 |

(Continued)

*Primary Examiner* — Isaac T Tecklu
(74) *Attorney, Agent, or Firm* — Barnes & Thornburg LLP (57) ABSTRACT

In at least one illustrative embodiment, a building automation system may comprise a communication network compatible with at least one building automation system communication protocol, a control system coupled to the communication network, and a building automation server coupled to the communication network. The building automation server may be configured to receive at least one event message over the communication network from the control system in response to a corresponding condition occurring on the control system, access past event messages generated by the control system in response to past occurrences of the corresponding condition, and generate event alert data as a function of the received at least one event message and the retrieved past event messages, the event alert data identifying (i) a name of the corresponding condition, (ii) a real-time status of the control system, and (iii) a quantitative summary of the past occurrences of the corresponding condition.

8 Claims, 3 Drawing Sheets

(56) References Cited

U.S. PATENT DOCUMENTS

| | | | | |
|---|---|---|---|---|
| 8,645,495 B2* | 2/2014 | Johnson | ............... | G05B 15/02 700/276 |
| 8,863,018 B2* | 10/2014 | Taylor | ............... | G05B 15/02 700/29 |
| 2002/0016639 A1* | 2/2002 | Smith | ............... | G05B 15/02 700/9 |
| 2003/0069648 A1* | 4/2003 | Douglas | ............... | G06Q 10/20 700/2 |
| 2007/0067062 A1* | 3/2007 | Mairs | ............... | G09B 25/04 700/275 |
| 2007/0219645 A1* | 9/2007 | Thomas | ............... | G05B 15/02 700/29 |
| 2013/0218302 A1* | 8/2013 | Leinen | ............... | G05B 15/02 700/17 |

* cited by examiner

EVENTS MANAGEMENT

CROSS REFERENCE TO RELATED APPLICATION

This application claims the benefit of U.S. Provisional Patent Application Ser. No. 61/777,079, filed Mar. 12, 2013, the entire disclosure of which is incorporated by reference herein.

BACKGROUND

A frequent challenge for managers of building automation systems is the management of lists of raw data provided from various control systems. Such data is most often presented in one or more tables, possibly with filtering methods presented as options to organize the raw data. As such, a building administrator may be tasked with skimming through upwards of tens or hundreds of thousands of event messages and/or alarms in an effort to identify which control systems require attention. The use of filters predominates as the typical method for sorting event messages and alarms. However, the use of generic filters has extremely poor usability. Although manual filters can be used to filter raw data, their use is cumbersome and often difficult to implement correctly.

SUMMARY

According to one aspect, a graphical user interface may comprise one or more graphical envelopes, where each graphical envelope represents a control system condition and includes a first graphical element indicating the control system condition, a second graphical element indicating a real-time status of a control system associated with the control system condition, and a third graphical element indicating a quantitative summary of past occurrences of the control system condition.

In some embodiments, each of the one or more graphical envelopes may comprise a continuous display region of the graphical user interface. The graphical user interface may comprise at least two graphical envelopes configured to be displayed simultaneously on a display of a computing device, where each of the at least two graphical envelopes represents a different control system condition. The control system may comprise one of a heating, ventilation, and air conditioning (HVAC) system, a security system, an access control system, an electrical system controller, a lighting system, an industrial automation and control system, a programmable logic controller, and a set of sensors.

In some embodiments, each of the one or more graphical envelopes may further include a fourth graphical element comprising a list of user entries associated with the control system condition. The fourth graphical element may be expandable and collapsible within each graphical envelope.

In some embodiments, the quantitative summary may comprise a total number of the past occurrences of the control system condition and at least one of a newest occurrence of the control system condition and an oldest occurrence of the control system condition. The quantitative summary may comprise a frequency of occurrence of the past occurrences of the control system condition.

In some embodiments, each of the first graphical element, the second graphical element, and the third graphical element may comprise a textual element. The second graphical element may comprise a pictorial element that indicates the real-time status of the control system as in an alarm status using a first color and as not in an alarm status using a second color different from the first color.

According to another aspect, a building automation system may comprise a communication network compatible with at least one building automation system communication protocol, a control system coupled to the communication network, and a building automation server coupled to the communication network. The building automation server may be configured to receive at least one event message over the communication network from the control system in response to a corresponding condition occurring on the control system, access past event messages generated by the control system in response to past occurrences of the corresponding condition, and generate event alert data as a function of the received at least one event message and the retrieved past event messages, where the event alert data identifies (i) a name of the corresponding condition, (ii) a real-time status of the control system, and (iii) a quantitative summary of the past occurrences of the corresponding condition.

In some embodiments, the at least one building automation system communication protocol may comprise one of a Building Automation and Control Network (BACnet) protocol and an Extensible Markup Language (XML) protocol. The corresponding condition occurring on the control system may comprise a sensor associated with the control system reading a value outside of a predetermined range. The real-time status of the control system may be a function of real-time sensor data received by the building automation server from the sensor associated with the control system.

In some embodiments, the quantitative summary may comprise a total number of the past occurrences of the corresponding condition and at least one of a newest occurrence of the corresponding condition and an oldest occurrence of the corresponding condition. The quantitative summary may comprise a frequency of occurrence of the past occurrences of the corresponding condition.

According to yet another aspect, a method for monitoring a building automation system may comprise receiving real-time data associated with a condition of a control system of the building automation system, accessing historical data indicating past occurrences of the condition of the control system, analyzing the historical data to generate a quantitative summary of the past occurrences of the condition of the control system, and transmitting the real-time data and the quantitative summary of the past occurrences to be displayed simultaneously as part of a graphical user interface on a computing device.

In some embodiments, the quantitative summary may identify a total number of the past occurrences of the condition, a newest occurrence of the condition, and an oldest occurrence of the condition. The quantitative summary may identify a frequency of occurrence of the past occurrences of the condition. Receiving the real-time data associated with the condition of the control system may comprise receiving real-time data over a communication network using a building automation system communication protocol.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other ele

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
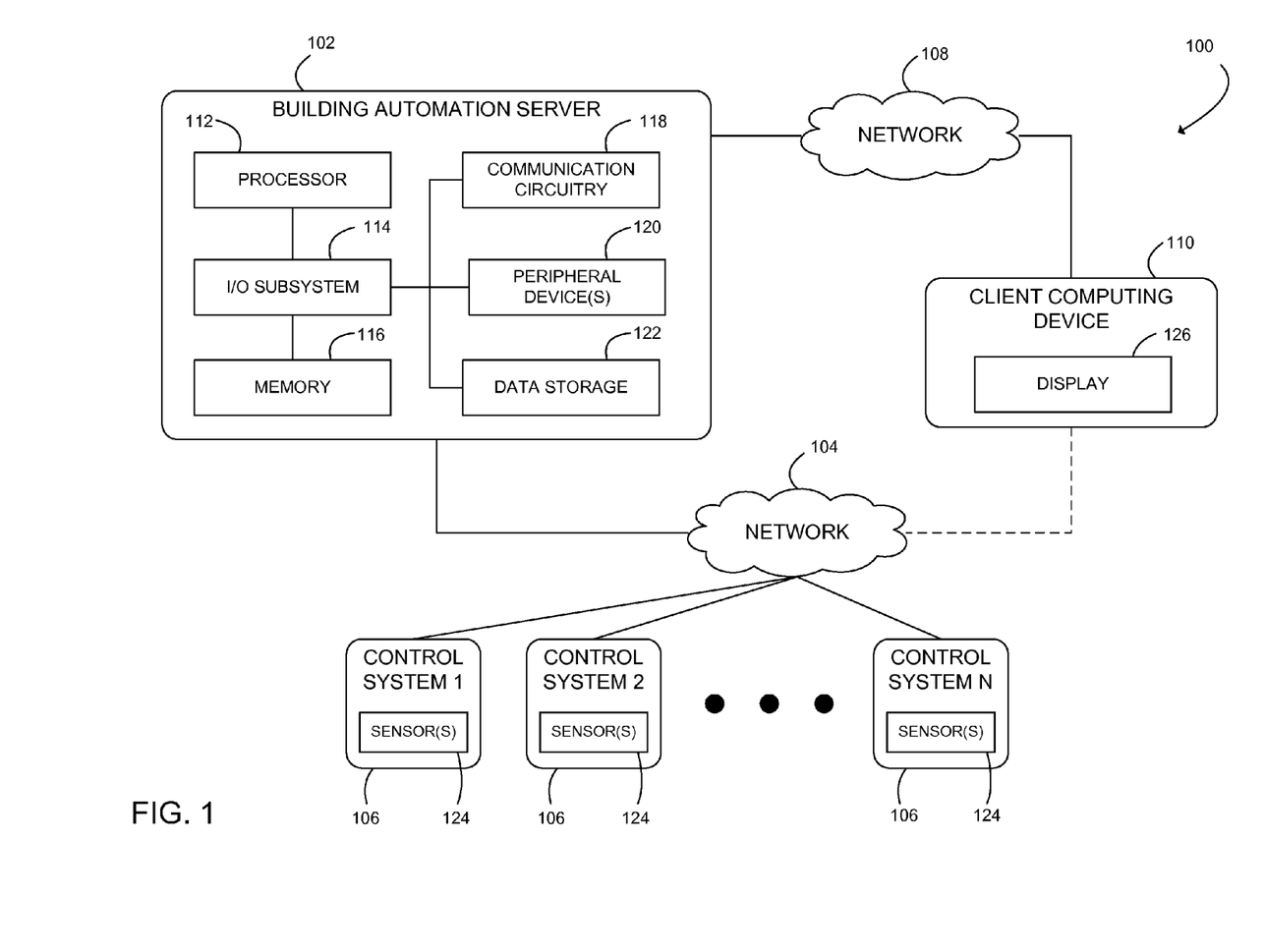
- FIG. 1 is a simplified block diagram of at least one embodiment of a system for generating and displaying event alert data associated with control systems.

Referring now to FIG. 1, a system 100 for generating and displaying event alert data associated with control systems includes a building automation server 102, a network 104, one or more control systems 106, a network 108, and a client computing device 110. In use, as discussed in more detail below, the building automation server 102 may generate event alert data as a function of event messages received from the one or more control systems 106 and transmit the event alert data to the client computing device 110 for display on a graphical user interface. Although only one building automation server 102, one network 104, one network 108, and one client computing device 110 are illustratively shown in FIG. 1, the system 100 may include any number of building automation servers 102, networks 104, networks 108, and client computing devices 110 in other embodiments. By way of example, the building automation server 102 may transmit event alert data to multiple client computing devices 110. Similarly, as illustrated in FIG. 1, the system 100 may include any number of control systems 106 (i.e., the number, N, of control systems 106 may be any integer).

The building automation server 102 may be embodied as any type of computing device capable of establishing a communication link with the control systems 106 and the client computing device 110 and performing the functions described herein. For example, the building automation server 102 may be embodied as an enterprise-level server, a desktop computer, a laptop computer, a mobile internet device, a handheld computer, a smart phone, a personal digital assistant, a telephony device, or other computing device. As shown in FIG. 1, the illustrative building automation server 102 includes a processor 112, an input/output ("I/O") subsystem 114, a memory 116, communication circuitry 118, one or more peripheral devices 120, and a data storage 122. It will be appreciated that the building automation server 102 may include other or additional components, such as those commonly found in a computing device or server (e.g., various input/output devices), in other embodiments. Additionally, in some embodiments, one or more of the illustrative components may be incorporated in, or otherwise from a portion of, another component. For example, the memory 116, or portions thereof, may be incorporated in the processor 112 in some embodiments.

The processor 112 may be embodied as any type of processor capable of performing the functions described herein. For example, the processor may be embodied as a single or multi-core processor(s), digital signal processor, microcontroller, or other processor or processing/controlling circuit. Similarly, the memory 116 may be embodied as any type of volatile or non-volatile memory or data storage capable of performing the functions described herein. In operation, the memory 116 may store various data and software used during operation of the building automation server 102, such as operating systems, applications, programs, libraries, drivers, and the like. The memory 116 is communicatively coupled to the processor 112 via the I/O subsystem 114, which may be embodied as circuitry and/or components to facilitate input/output operations with the processor 112, the memory 116, and other components of the building automation server 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The communication circuitry 118 of the building automation server 102 may be embodied as any communication circuit, device, or collection thereof, capable of enabling communications between the building automation server 102 and other remote devices (e.g., the control systems 106 and the client computing device 110) over the networks 104, 108. The communication circuitry 118 may be configured to use any one or more communication technologies (e.g., wireless or wired communications) and associated protocols to effect such communication. For example, in some embodiments, the communication circuitry 118 may be configured to communicate with other devices (e.g., the control systems 106) using a building automation system communication protocol such as the Building Automation and Control Network ("BACnet®") protocol and/or the Extensible Markup Language ("XML") protocol. The BACnet® protocol is described in "ANSI/ASHRAE Standard 135-2010, BACnet—A Data Communication Protocol for Building Automation and Control Networks," which is incorporated by reference in its entirety. The BACnet® protocol is also sometimes referred to ISO 16484-5.

The one or more peripheral devices 120 of the building automation server 102 may include any number of peripheral or interface devices. By way of example, the one or more peripheral devices 120 may include a keyboard, a touch screen, a display, and/or other interface devices. The data storage 122 may be embodied as any type of device or devices configured for short-term or long-term storage of data such as, for example, memory devices and circuits, memory cards, hard disk drives, solid-state drives, or other data storage devices. As discussed in detail below, the data storage 122 may be used to store, for example, past event messages associated with specific control system conditions.

The networks 104, 108 may be embodied as any number of various wired and/or wireless communication networks. As such, the networks 104, 108 may include one or more networks, routers, switches, computers, and/or other intervening devices. For example, the networks 104, 108 may be embodied as or otherwise include one or more cellular networks, telephone networks, local or wide area networks, publicly available global networks (e.g., the Internet), or any combination thereof. In the illustrative embodiment, the network 104 is a wired communication network configured to transmit event messages from the control systems 106 to the building automation server 102 (e.g., via the BACnet® protocol), whereas the network 108 is wide area communication network (e.g., the Internet) configured to transmit the generated event alert data from the building automation server 102 to the client computing device 110 for display in a graphical user interface. Although shown as two distinct networks in the illustrative embodiment of FIG. 1, in other embodiments, the networks 104, 108 may comprise a single network.

The one or more control systems 106 may be embodied as any number of electrical or electromechanical devices capable of performing the functions described herein. For example, the control systems 106 may include heating, ventilation, and air conditioning (HVAC) systems, security systems, safety systems, access control systems, electrical system controllers, lighting systems, industrial automation and control systems, life science and pharmacological control equipment, flood and air handling equipment, programmable logic controllers, and sets of sensors. As shown in FIG. 1, each of the control systems 106 may include one or more sensors 124 to sense a condition of the associated control system 106. Although the illustrative embodiment of FIG. 1 shows the building automation server 102 communicating directly with the control systems 106 via the network 104, in some embodiments, one or more intermediary computing devices may receive event messages and/or sensor data from the control systems 106 and forward them to the building automation server 102.

The client computing device 110 may be embodied as any type of computing device capable of communicating with the building automation server 102 and performing the functions described herein. That is, the client computing device 110 may be embodied as an enterprise-level server, a desktop computer, a laptop computer, a mobile internet device, a handheld computer, a smart phone, a personal digital assistant, a telephony device, or other computing device. Further, the client computing device 110 may include components similar to those of the building automation server 102 discussed above. The description of those components of the building automation server 102 is equally application to the description of components of the client computing device 110 and is not repeated herein for clarity of the description. Among other components, the client computing device 110 includes a display 126 for displaying a graphical user interface. Further, it should be appreciated that the client computing device 110 may include other components, sub-components, and devices commonly found in a computing device, which are also not discussed herein for clarity of the description.

Figure 2:
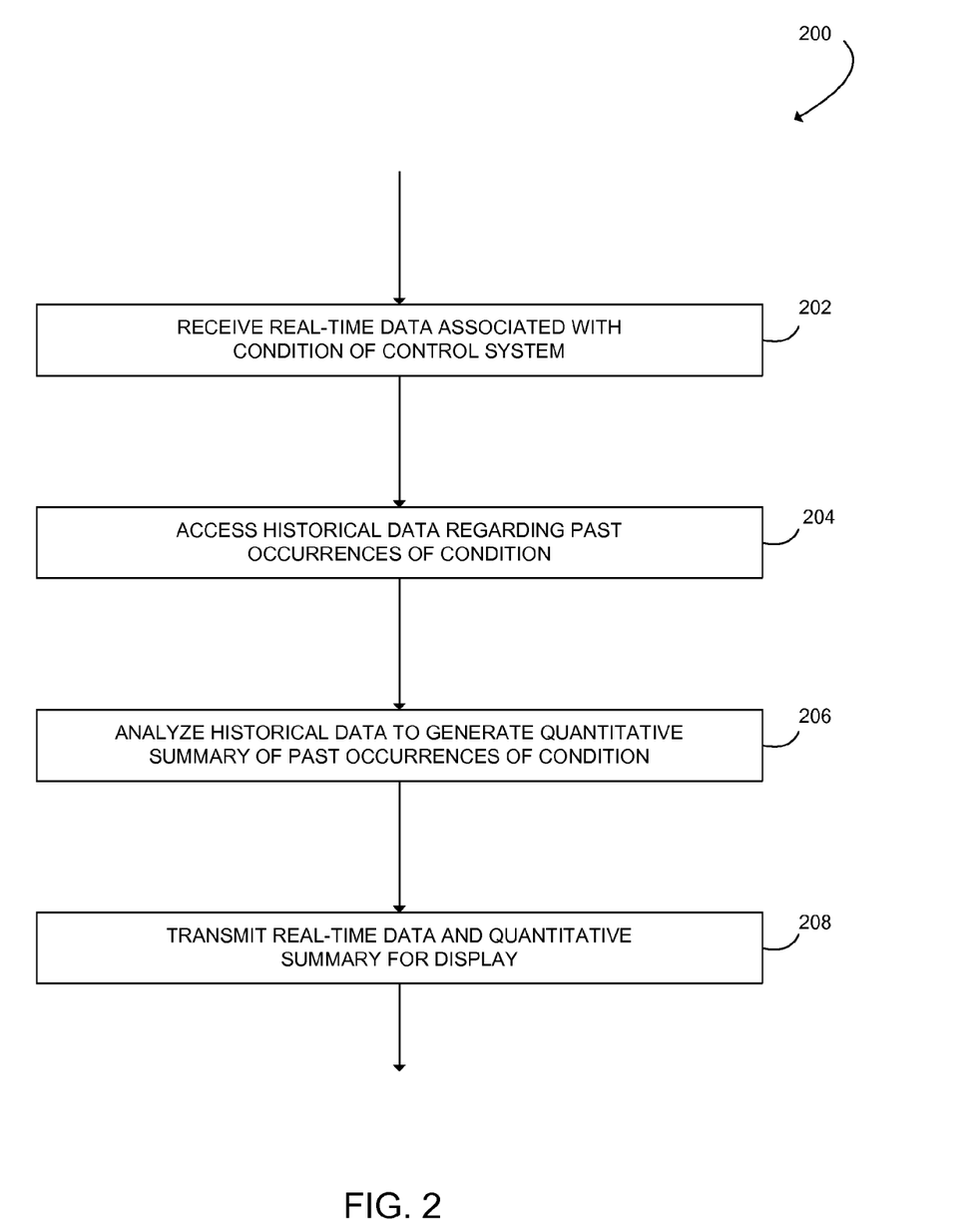
FIG. 2 is a simplified flow diagram of at least one embodiment of method for generating event alert data with the system of FIG. 1.

Referring now to FIG. 2, in use, the system 100 may execute a method 200 for generating event alert data. In particular, the method 200 may be executed by the building automation server 102, in conjunction with the other components of the system 100. The method begins with block 202 in which the building automation server 102 receives real-time data associated with a condition of a control system 106. In some embodiments, conditions may be predefined and stored on the building automation server 102 and/or the control system 106 (or a component thereof). Further, each control system 106 may have any number of conditions and different control systems 106 may have similar or different conditions.

For example, in an embodiment, a system administrator or an original equipment manufacturer ("OEM") specification may indicate that the temperature of a particular sensor 124 of a control system 106 should stay within a certain range for optimal performance and should never exceed a maximum temperature to prevent damage to the control system 106. In such an embodiment, a first condition may be defined as the temperature read by the sensor 124 surpassing the optimal temperature range, and a second condition may be defined as the temperature read by the sensor 124 exceeding the maximum temperature. Additionally, in some embodiments, a condition's occurrence may require several control systems 106 or sensors 124 of one or more control systems 106 to behave a certain way in tandem.

In response to the occurrence of any condition, in some embodiments, the control system 106 may transmit an event message corresponding with the condition to the building automation server 102. In the above example, the building automation server 102 may receive real-time data (e.g., real-time sensor data) of the temperature of the sensor 124. As such, the real-time data may indicate the real-time status of the control system 106 associated with the condition. It will be appreciated that real-time data may include some minor delay in time (e.g., from transmission delay, etc.).

After block 202, the method 200 proceeds to block 204 in which the building automation server 102 accesses historical data regarding past occurrences of the condition of the control system 106. As discussed above, the building automation server 102 may receive event messages from a control system 106 indicating the occurrence of a condition of the control system 106. Such event messages may be stored as historical data in the data storage 122 of the building automation server 102. In particular, the building automation server 102 may analyze an event messages as it is received to determine whether the associated condition is a new condition or matches an existing condition stored in the data storage 122 as historical data. If the event message relates to an existing condition, the historical data may be updated with information regarding the new condition occurrence. As such, the building automation server 102 is able to track the number of occurrences of the condition. However, if the event message is a first occurrence of a new condition, a new condition may be created and stored in the data storage 122 as historical data. In other embodiments, historical data may be stored in a database external to the building automation server 102 (alternatively, or additionally, to the data storage 122). As discussed above, in some embodiments, the historical data may comprise tens of thousands to hundreds of thousands of event messages. It is contemplated that, in other embodiments, the historical data may include any number of event messages.

After block 204, the method 200 proceeds to block 206 in which the building automation server 102 analyzes historical data to generate a quantitative summary of the past occurrences of the condition of the control system 106. That is, in an embodiment, the building automation server 102 distills the historical data to a more convenient and immediately usable form. For example, in some embodiments, the quantitative summary identifies the oldest (or first) occurrence of a particular condition of the control system 106, the newest (or last) occurrence of the particular condition, and the total number of occurrences of the particular condition. Further, the quantitative summary may identify the frequency of occurrence of the particular condition (i.e., number of occurrences in a given temporal range). In other embodiments, the quantitative summary may include one or more of the elements discussed herein and other similar elements. As discussed above, the building automation server 102 may receive event messages associated with numerous conditions of particular control systems 106. Accordingly, in some embodiments, the building automation server 102 may generate a separate quantitative summary for each condition (as discussed in more detail below with reference to FIG. 3).

After block 206, the method 200 proceeds to block 208 in which the building automation server 102 transmits real-time data and the quantitative summary associated with the condition of the control system 106 to the client computing device 110. As indicated above, the building automation server 102 may receive the corresponding real-time data from one or more control systems 106 and may generate quantitative summaries for numerous conditions of the one or more control systems 106. As such, in some embodiments, the building automation server 102 may transmit real-time data and a quantitative summary to the client computing device 110 for multiple conditions of the one or more control systems 106. It is contemplated that the specific conditions may be identified by name or in some other readily usable way. In different embodiments, the building automation server 102 may transmit real-time data and quantitative summaries to the client computing device 110 immediately, periodically, or in response to some action (e.g., a request from the client computing device 110).

Figure 3:
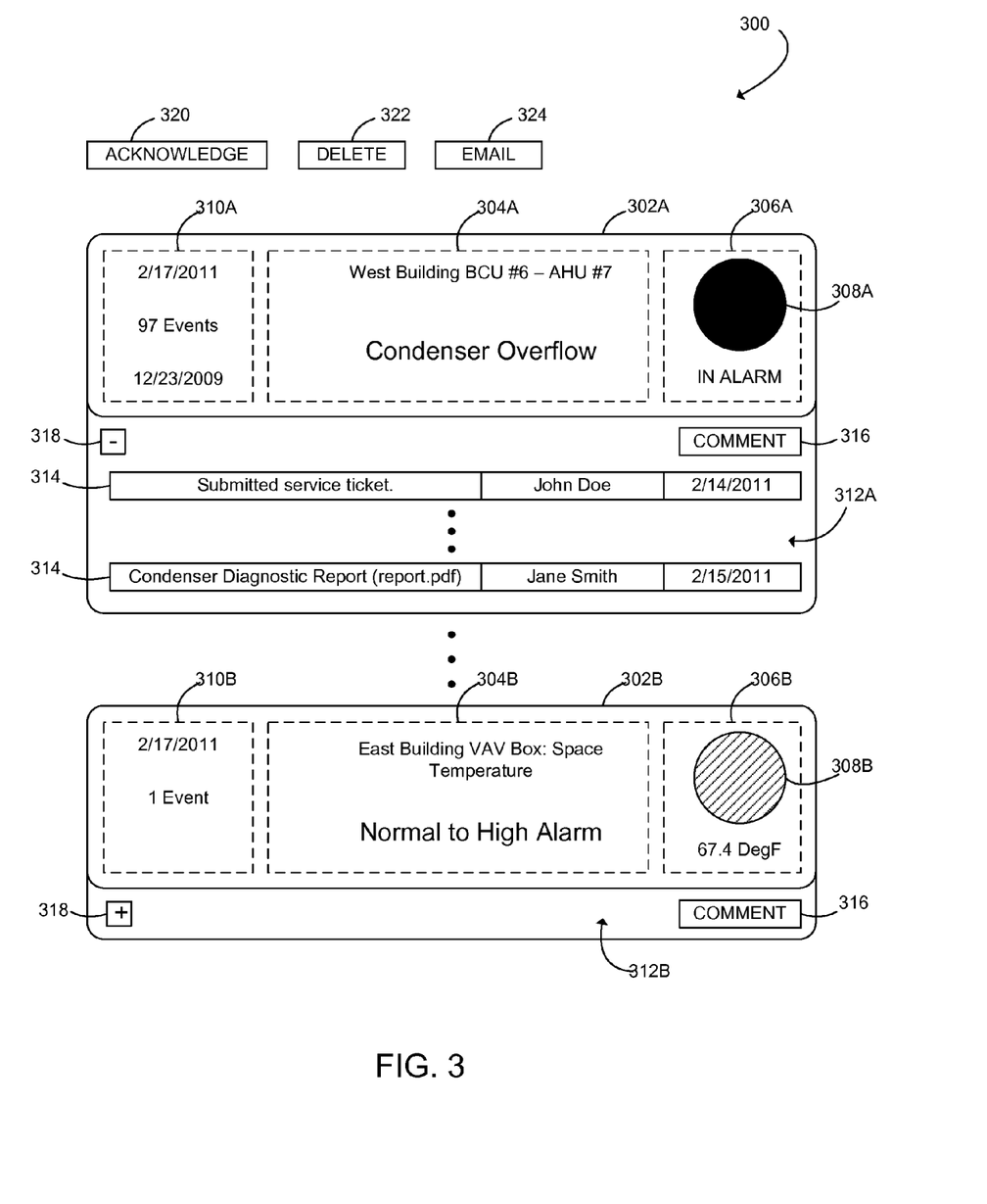
FIG. 3 illustrates at least one embodiment of a graphical user interface using the event alert data generated by the system of FIG. 1.

Referring now to FIG. 3, the client computing device 110 may display a graphical user interface on the display 126. The graphical user interface 300 may be used by a system administrator for various purposes. For example, the system administrator may use the graphical user interface 300 to quickly identify the real-time status of various control systems 106 and triage any alarms. Further, the graphical user interface 300 may include the quantitative summary, which is a succinct analysis of the history of each control system 106 condition. Armed with the quantitative summary, the system administrator may quickly determine, for example, whether any given problem or alarm is likely acute or chronic.

The illustrative embodiment of the graphical user interface 300 shown in FIG. 3 includes graphical envelopes 302. Although FIG. 3 specifically illustrates two graphical envelopes 302A, 302B, it is contemplated that the graphical user interface 300 may include any number of graphical envelopes 302. Each graphical envelope 302 includes various graphical elements and is associated with a particular control system condition. Further, each graphical envelope 302 acts as a virtual container to distinguish various control system conditions from one another. As such, in some embodiments, each graphical envelope 302 comprises a continuous display region of the graphical user interface 300 and is likewise configured to be displayed on a continuous display region of the display 126 of the client computing device 110. Although the graphical envelopes 302 in the illustrative embodiment of FIG. 3 are shown as clearly delimited and rounded rectangles, in other embodiments, the graphical envelopes 302 may be some other continuous shape and/or may not be visually delimited. In some embodiments, such as the illustrative embodiment, the graphical envelopes 302 are configured to be displayed simultaneously on the display 126.

The two graphical envelopes 302A, 302B shown in FIG. 3 each illustratively include four graphical elements 304, 306, 310, 312. It will be appreciated that, in other embodiments, the graphical envelopes 302 may include more or fewer graphical elements, including other graphical elements not shown. A first graphical element 304 identifies the control system condition associated with that graphical envelope 302. For example, the first graphical element 304A identifies the control system condition associated with the graphical envelope 302A as "Condenser Overflow," whereas the first graphical element 304B identifies the control system condition associated with the graphical envelope 302B as "Normal to High Alarm." It should be appreciated that in some embodiments, the first graphical element 304 may represent the condition in readily understood common parlance as opposed to technical/scientific terms or data. For example, in the circumstance in which a control system 106 reached or approached a critical temperature, the first graphical element 304 may read "System Overheat" rather than "Sensor ID343920: 146.3° F.—Threshold: 148.0° F., Sensor ID340983: 152.3° F.—Threshold: 151.0° F." or other technical language. In some embodiments, the first graphical element 304 also identifies on which control system 106 the condition occurred. In the illustrative embodiment, the first graphical element 304A identifies that the condition of "Condenser Overflow" has occurred on the "West Building BCU #6-AHU #7." That is, the condition occurred on a specifically identified air handling unit ("AHU") associated with a particular building control unit ("BCU") in a particular building. Similarly, the first graphical element 304B identifies that the condition "Normal to High Alarm" occurred on the "East Building VAV Box" and is associated with the "Space Temperature" of that particular control system 106. In other words, the first graphical element 304B indicates that the variable air volume ("VAV") box may be overheating.

A second graphical element 306 indicates the real-time status of the control system 106 associated with the control system condition. In some embodiments, the real-time status may be represented as a pictorial element and/or a textual element. Various colors, shapes, textures, or shades may be used to represent something about the real-time status of the control system 106. In the illustrative embodiment, the second graphical elements 306A, 306B each includes a pictorial element 308A, 308B and a textual element. The pictorial element 308A is shown as a solid color (e.g., red) to represent that the associated control system 106 is in an alarm state, whereas the pictorial element 308B is shown as a shaded region to represent a less pressing alarm state of the associated control system 106. Further, the second graphical element 306A textually identifies that the associated control system 106 is in an alarm state, whereas the second graphical element 306B textually identifies the current non-alarm state (e.g., temperature) of its associated control system 106. The pictorial elements 308 may represent the real-time status of the associated control system 106 in a myriad of ways. For example, different colors or gradients of colors may be used to represent various alarm states (e.g., normal operation, warning, low alarm, high alarm, danger, etc.). Similarly, concentric rings may be used such that each additional ring indicates, for example, a status requiring more urgent attention. It is contemplated that the textual element of the second graphical element 306 could also vary in description and/or font based on the alarm state of the associated control system 106.

A third graphical element 310 includes a quantitative summary of the past occurrences of the control system condition. As discussed above, the quantitative summary may include, for example, the newest occurrence of the control system condition, the oldest occurrence of the control system condition, and a total number of past occurrences of the control system condition. In some embodiments, each of those historical characteristics may be described in some way in the third graphical element 310. For example, the third graphical element 310A identifies (1) Feb. 17, 2011, as the newest occurrence, (2) Dec. 23, 2009, as the oldest occurrence, and (3) that 97 total occurrences occurred in the interval. Similarly, the third graphical element 310B identifies only one occurrence of the control system condition, which occurred on Feb. 17, 2011. Because there was only one occurrence of the control system condition, the oldest occurrence was omitted from the third graphical element 310B. It will be appreciated that the third graphical element 310B could identify Feb. 17, 2011, as the newest and/or oldest occurrence of the condition in various embodiments. In another embodiment, the third graphical element 310 may alternatively or additionally identify a frequency of occurrence of the control system condition.

A fourth graphical element 312 includes a list of user entries 314 associated with the control system condition. In the illustrative embodiment, the fourth graphical element 312 is expandable and collapsible within its graphical envelope 302 by clicking a corresponding button 318 of the fourth graphical element 312. In some embodiments, the list of user entries 314 may include user-entered comments and/or reports associated with the control system condition. For example, the list of the fourth graphical element 312A includes at least two entries 314 (although the ellipsis indicates that the fourth graphical element 312 may include any number of entries 314). The first entry shown in graphical element 312A is a user-entered comment by John Doe identifying that he submitted a service ticket on Feb. 14, 2011, regarding the control system condition. The second entry shown indicates that Jane Smith submitted a Condenser Diagnostic Report on Feb. 15, 2011. In some embodiments, the list may include a hyperlink to additional information (e.g., any submitted reports). The fourth graphical element 312 also includes a button 316 that a user may click to provide a new entry 314 regarding the control system condition. In other embodiments, the list may also include a log of the details regarding the discrete occurrences of the control system condition. That is, the log may include the specific time and dates of each occurrence and may additionally include specific details regarding the associated control system 106 upon each occurrence (e.g., values read by a sensor 124, equipment maintenance status, and other details). In the illustrative embodiment, the fourth graphical element 312B is shown as collapsed.

The graphical user interface 300 may also include buttons for the user to click in order to perform various other tasks. For example, the graphical user interface 300 may include a button 320 which may be used to acknowledge one or more control system conditions. In some embodiments, by acknowledging an alarm or other condition, the client computing device 110 may send a message to, for example, a BACnet® controller indicating the acknowledgement. For systems with multiple system administrators, an alarm may be sent to another administrator if not acknowledged in a given amount of time. Additionally, the graphical user interface 300 may include a button 322 that allows the user to delete something from a graphical envelope 302 (e.g., the graphical envelope itself, a user-entered comment, a submitted report, one or more condition occurrences in a log, or other items). The graphical user interface 300 may also include a button 324 to email one or more components of the graphical user interface 300. For example, a system administrator may want to email a reminder to address a control system condition. As such, in some embodiments, the graphical envelope 302 associated with the particular condition may be emailed to the system administrator using the button 324. It should be appreciated that the graphical user interface 300 may include additional peripheral graphical elements or features not discussed herein for clarity of the description.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A building automation system comprising:
   a communication network compatible with at least one building automation system communication protocol;
   a control system coupled to the communication network; and
   a building automation server coupled to the communication network and configured to:
      receive at least one event message over the communication network from the control system in response to a corresponding condition occurring on the control system;
      access past event messages generated by the control system in response to past occurrences of the corresponding condition; and generate event alert data as a function of the received at least one event message and the retrieved past event messages, the event alert data identifying (i) a name of the corresponding condition, (ii) a real-time status of the control system, and (iii) a quantitative summary of the past occurrences of the corresponding condition; and wherein the quantitative summary comprises a total number of the past occurrences of the corresponding condition, the latest occurrence of the corresponding condition from the past occurrences of the corresponding condition, and the oldest occurrence of the corresponding condition from the past occurrences of the corresponding condition.

2. The building automation system of claim 1, wherein the at least one building automation system communication protocol comprises one of a Building Automation and Control Network (BACnet) protocol and an Extensible Markup Language (XML) protocol.

3. The building automation system of claim 1, wherein the corresponding condition occurring on the control system comprises a sensor associated with the control system reading a value outside of a predetermined range.

4. The building automation system of claim 3, wherein the real-time status of the control system is a function of real-time sensor data received by the building automation server from the sensor associated with the control system.

5. The building automation system of claim 1, wherein the quantitative summary comprises a frequency of occurrence of the past occurrences of the corresponding condition.

6. A method for monitoring a building automation system comprising:

receiving real-time data associated with a condition of a control system of the building automation system;

accessing historical data indicating past occurrences of the condition of the control system;

analyzing the historical data to generate a quantitative summary of the past occurrences of the condition of the control system, wherein the quantitative summary identifies a total number of the past occurrences of the condition, the latest occurrence of the corresponding condition from the past occurrences of the corresponding condition, and the oldest occurrence of the corresponding condition from the past occurrences of the corresponding condition; and transmitting the real-time data and the quantitative summary of the past occurrences to be displayed simultaneously as part of a graphical user interface on a computing device.

7. The method of claim 6, wherein the quantitative summary identifies a frequency of occurrence of the past occurrences of the condition.

8. The method of claim 6, wherein receiving the real-time data associated with the condition of the control system comprises receiving real-time data over a communication network using a building automation system communication protocol.

\* \* \* \* \*